(12) United States Patent
Kwag et al.

(10) Patent No.: US 8,198,378 B2
(45) Date of Patent: Jun. 12, 2012

(54) AROMATIC ORGANOSULFUR FUNCTIONALIZED 1,4-CIS POLYBUTADIENE

(75) Inventors: Gwang Hoon Kwag, Daejeon (KR); Pil Sung Kim, Daejeon (KR); Seung Hwon Lee, Daejeon (KR); Hyung Kyu Choi, Daejeon (KR); Hyun Jin Kim, Carlsbad, CA (US)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 670 days.

(21) Appl. No.: 12/254,505

(22) Filed: Oct. 20, 2008

(65) Prior Publication Data

US 2009/0156751 A1   Jun. 18, 2009

(30) Foreign Application Priority Data

Dec. 12, 2007   (KR) .................. 10-2007-0129265

(51) Int. Cl.
C08C 19/20 (2006.01)
C08C 19/22 (2006.01)

(52) U.S. Cl. .......... 525/333.2; 525/331.9; 525/332.4; 525/332.7; 525/343; 525/346; 525/350; 525/351; 525/374

(58) Field of Classification Search .......... 525/331.9, 525/332.4, 332.7, 333.2, 343, 346, 350, 351, 525/374
See application file for complete search history.

(56) References Cited

U.S. PATENT DOCUMENTS

| | | |
|---|---|---|
| 2,979,488 A * | 4/1961 | Carpenter ............... 525/333.1 |
| 3,170,905 A | 2/1965 | Ueda et al. |
| 3,725,492 A | 4/1973 | Ukita et al. |
| 4,129,538 A | 12/1978 | Kaplan et al. |
| 4,182,814 A | 1/1980 | Bernemann et al. |
| 4,260,707 A | 4/1981 | Sylvester et al. |
| 4,429,089 A | 1/1984 | Pedretti et al. |
| 4,699,962 A | 10/1987 | Hsieh et al. |
| 5,017,539 A | 5/1991 | Jenkins et al. |
| 5,397,851 A | 3/1995 | Knauf et al. |
| 5,557,784 A | 9/1996 | Dayan et al. |
| 5,733,835 A | 3/1998 | Castner |
| 5,905,125 A | 5/1999 | Tsujimoto et al. |
| 6,013,746 A | 1/2000 | Jang et al. |
| 6,255,416 B1 | 7/2001 | Sone et al. |
| 6,562,917 B2 | 5/2003 | Jang et al. |
| 6,624,256 B2 | 9/2003 | Kwag et al. |
| 6,727,330 B1 | 4/2004 | DeDecker et al. |
| 6,984,706 B2 | 1/2006 | Karato et al. |
| 7,157,514 B2 | 1/2007 | Voorheis et al. |
| 7,247,695 B2 | 7/2007 | Kwag et al. |
| 7,288,612 B2 | 10/2007 | Desbois et al. |
| 2004/0230010 A1 * | 11/2004 | Kwag et al. ............. 525/331.9 |

FOREIGN PATENT DOCUMENTS

| | | |
|---|---|---|
| EP | 0 011 184 BI | 5/1983 |
| EP | 0 375 421 A1 | 6/1990 |
| EP | 0 386 808 B1 | 11/1993 |
| EP | 0 267 675 B1 | 11/1994 |
| EP | 0 652 240 B1 | 1/1998 |
| EP | 0 713 385 B1 | 3/1999 |
| GB | 2002003 A | 2/1979 |
| WO | WO 02/36615 A | 5/2002 |

* cited by examiner

*Primary Examiner* — Roberto Robago
(74) *Attorney, Agent, or Firm* — Frommer Lawrence & Haug LLP; Ronald R. Santucci (57) ABSTRACT

The present invention relates to a preparation method of aromatic organosulfur functionalized 1,4-cis polybutadiene comprising: polymerizing 1,3-butadiene or butadiene derivative in the presence of a specific catalyst in a nonpolar solvent to prepare 1,4-cis polybutadiene; and reacting the resultant polybutadiene with an aromatic organosulfur compound. Such prepared aromatic organosulfur functionalized 1,4-cis polybutadiene is without ultrahigh molecular weight region and, thus, has narrow molecular weight distribution.

4 Claims, 6 Drawing Sheets

AROMATIC ORGANOSULFUR FUNCTIONALIZED 1,4-CIS POLYBUTADIENE

The application claims priority of Korean Patent Application No. KR 10-2007-0129265 filed Dec. 12, 2007, the disclosure of which is hereby incorporated by reference.

TECHNICAL FIELD

The present invention relates to a preparation of 1,4-cis polybutadiene chemically functionalized by an aromatic organosulfur compound molecule. More specifically, the organosulfur functionalized 1,4-cis polybutadiene is obtained by first preparing 1,4-cis polybutadiene using a specific catalyst and reacting the resultant polybutadiene polymer with an aromatic organosulfur compound alone or with an aromatic organosulfur compound and an isocyanate compound to form a chemical bond. The aromatic organosulfur functionalized 1,4-cis polybutadiene has narrow molecular weight distribution and is without an ultrahigh molecular weight region. Therefore, it has a uniform crosslinking density and, when used for a rubber composition, it improves blending processability, elasticity and mechanical properties.

BACKGROUND ART

Various preparation methods of 1,4-cis polybutadiene are available.

Preparation methods of 1,4-cis polybutadiene using a rare earth element are disclosed in European Patent Nos. 11,184 B1 and 652,240 and U.S. Pat. Nos. 4,260,707 and 5,017,539. In these methods, 1,4-cis polybutadiene is prepared in the presence of a nonpolar solvent by adding a neodymium carboxylate compound, an alkylaluminum compound and a Lewis acid.

U.K. Patent No. 2,002,003 and U.S. Pat. No. 4,429,089 disclose a method of preparing 1,4-cis polybutadiene by adding $AlR_2X$ (R=hydrogen or alkyl, X=hydrogen, alkoxy or thioalkoxy), an alkylaluminum compound and a neodymium compound.

In U.S. Pat. No. 4,699,962, a catalyst prepared by reacting neodymium hydride, a chloride compound and an electron donor ligand and then adding an organoaluminum compound is used to prepare high 1,4-cis polybutadiene.

In European Patent No. 375,421 and U.S. Pat. No. 5,017, 539, a neodymium compound, an organic halogen compound and an organoaluminum compound are aged at a temperature below 0° C. and high 1,4-cis polybutadiene is prepared as a result.

Examples of modifying the terminal groups of polybutadiene, such as epoxy, siloxane, isocyanate, etc., utilizing the living property of neodymium catalyst include WO 02/36615, European Patent Nos. 713 885 and 267 675 and U.S. Pat. No. 6,624,256. In European Patent No. 386 808 B1, a catalyst comprising a neodymium carboxylate compound, an alkylaluminum compound and a halogen containing compound is utilized to polymerize 1,4-cis polybutadiene in a nonpolar solvent. Then, a trichlorophosphine compound ($PCl_3$) is added to improve processability by reducing low-temperature flowability. Here, Mooney viscosity increases remarkably, depending on the amount of $PCl_3$.

In U.S. Pat. No. 6,255,416, a catalyst comprising Nd(versatate)$_3$, methylaluminoxane (MAO), Al(iBu)$_2$H, a metal halide and a Lewis base is used, and a tin compound and an isocyanate compound are used to control physical properties.

In U.S. Pat. No. 7,247,695, an example of preparing a polybutadiene-polyurethane copolymer using a neodymium polybutadiene and an isocyanate compound, etc., are disclosed.

Polybutadiene prepared using a catalyst comprising a rare earth metal such as neodymium has superior physical properties because of its linear molecular structure. However, it has a storage problem because of cold flow. To solve this problem, U.S. Pat. No. 5,557,784 presents a method for controlling cold flow. In this patent, 1,4-cis polybutadiene is prepared in a nonpolar solvent using a catalyst comprising a neodymium carboxylate compound, an alkylaluminum compound and a halogen containing compound. Then, after stopping the reaction using a reaction terminator and an antioxidant, sulfur chloride is added after removing unreacted 1,3-butadiene in order to reduce the odor caused by the addition of sulfur chloride.

As examples of preparation of 1,4-cis polybutadiene using nickel carboxylate, U.S. Pat. Nos. 6,013,746 and 6,562,917 disclose a method for preparing 1,4-cis-polybutadiene in a nonpolar solvent using a catalyst comprising (1) a nickel carboxylate compound, (2) a fluorine compound and (3) an alkylaluminum compound.

In a method disclosed in U.S. Pat. No. 3,170,905, a catalyst comprising at least one compound selected from nickel carboxylate and an organonickel complex compound, at least one compound selected from a fluoroboron compound and a complex thereof, and at least one compound selected from an organometal compound of a group II or III metal and an alkali metal is used.

U.S. Pat. No. 3,725,492 discloses a method of preparing 1,4-cis-polybutadiene having a very small molecular weight from polymerization of 1,3-butadiene using a catalyst comprising a nickel compound, a halogen compound and an organoaluminum compound. In U.S. Pat. No. 6,727,330, nickel carboxylate, a polymerization terminator comprising an inorganic base and an amine compound or carboxylic acid is used to prevent gel-formation during polymerization of butadiene using a catalyst comprising a fluoroboron compound and an organometal compound of alkali metal.

Preparation of polybutadiene with high 1,4-cis content using cobalt carboxylate, for example, using a catalyst comprising (1) a cobalt carboxylate compound and (2) an alkylaluminum compound, in a nonpolar solvent is disclosed in the followings. U.S. Pat. Nos. 4,182,814, 5,397,851, 5,733,835 and 5,905,125 present a method of contacting butadiene and a catalyst in liquid phase. Along with a cobalt carboxylate catalyst, a cocatalyst comprising an organometal compound, water, etc., is are used.

1,4-Cis polybutadiene can also be prepared in a nonpolar solvent by reacting butadiene with an alkali metal catalyst. In this case, polybutadiene with a cis content of 30% or higher is attained in general, although the cis content is affected by additives. For example, U.S. Pat. Nos. 7,288,612 and 6,984, 706 disclose methods of polymerizing butadiene in liquid phase by contacting with an alkali metal catalyst.

In U.S. Pat. No. 4,129,538, an aromatic organosulfur compound is used to reduce rigidity and viscosity of natural rubber and synthetic butadiene-styrene rubber in order to provide better workability. Here, a halogenated sulfur compound, etc., are used as the aromatic organosulfur compound. By mixing rubber and the aromatic organosulfur compound in an open mill, it is possible to improve processability by reducing Mooney viscosity and to reduce work time. Specifically, for the aromatic organosulfur compound, pentachlorothiophenol, xylyl mercaptan, tetrachlorobenzenedithiol, mercaptobenzothiazole, dibenzoyl disulfide, dibenzamidodiphenyl disulfide, dibenzothiazyl disulfide, pentachlorophenyl disulfide, zinc pentachlorothiophenol, zinc xylyl mercaptan, zinc dibenzamidodiphenyl disulfide, and the like are used.

In U.S. Pat. No. 7,157,514, aromatic organosulfur compounds including the followings are presented: zinc bis(pentachlorothiophenol), fluorothiophenol, chlorothiophenol, bromothiophenol, iodothiophenol, difluorothiophenol, dichlorothiophenol, dibromothiophenol, diiodothiophenol, trifluorothiophenol, trichlorothiophenol, tribromothiophenol, triiodothiophenol, tetrafluorothiophenol, tetrachlorothiophenol, tetrabromothiophenol, tetraiodothiophenol, pentafluorothiophenol, pentachlorothiophenol, pentabromothiophenol, pentaiodothiophenol, bis(fluorophenyl)disulfide, bis(chlorophenyl)disulfide, bis(bromophenyl)disulfide, bis(iodophenyl)disulfide, bis(2-chloro-5-iodo)disulfide, bis(2-chloro-5-bromophenyl)disulfide, bis(2-chloro-5-fluoro)disulfide, bis(trifluorophenyl)disulfide, bis(trichlorophenyl)disulfide, bis(tribromophenyl)disulfide, bis(triiodophenyl)disulfide, bis(tetrafluorophenyl)disulfide, bis(tetrachlorophenyl)disulfide, bis(tetrabromophenyl)disulfide, bis(tetraiodophenyl)disulfide, bis(pentafluorophenyl)disulfide, bis(pentachlorophenyl)disulfide, bis(pentabromophenyl)disulfide, bis(pentaiodophenyl)disulfide, bis(acetylphenyl)disulfide, bis(3-aminophenyl)disulfide, tris(2,3,5,6-tetrachlorophenyl)methane, tris(2,3,5,6-tetrachloro-4-nitrophenyl)methane, di(pentachlorophenyl)phosphine chloride and di(pentafluorophenyl)phosphine chloride.

As described above, an aromatic organosulfur compound stabilizes polymer radicals formed by the cutting of polymer chains, thereby preventing reassembly, reducing molecular weight of the polymer, improving uniform distribution and blending, and increasing crosslinking density.

DISCLOSURE

Technical Problem

Unlike the conventional methods in which an aromatic organosulfur compound is added during blending, the present invention aims at maximizing the effect of the aromatic organosulfur compound by using polybutadiene in which aromatic organosulfur compounds are bound to the polymer chain at the molecular level. At the same time, the present invention aims at reducing polymer portion of the polybutadiene and narrowing molecular weight distribution, thereby improving processability and physical properties.

When the aromatic organosulfur compound is added during blending, a sufficient time for mixing is required because of its poor compatibility with rubber. And, the resultant rubber surface may be coarse. The present invention solves this problem through "molecular-level design" and maximizes the effect of aromatic organosulfur compound and physical properties of polymers.

Technical Solution

In an aspect, the present invention provides aromatic organosulfur functionalized 1,4-cis polybutadiene represented by the following Chemical Formula 1 or Chemical Formula 2:

[Chemical Formula 1]

[Chemical Formula 2]

where l, m, n and o respectively represent the number of repeating units of polybutadiene main chain, with l ranging from 30 to 99 weight %, m ranging from 0.05 to 5 weight %, n ranging from 0 to 50 weight %, o ranging from 0 to 50 weight %, and (l+m+n+o)=100 weight %, SAr represents an aromatic organosulfur compound, and $R_1$ represents an isocyanate compound.

In another aspect, the present invention provides a preparation method of aromatic organosulfur functionalized 1,4-cis polybutadiene comprising: a first step of polymerizing 1,3-butadiene or butadiene derivative in the presence of an alkali metal catalyst or a catalyst comprising 1) 1 mol of a rare earth element compound or a transition metal compound, 2) 1 to 10 molar equivalents of a halogen containing compound, and 3) 10 to 100 molar equivalents of an organoaluminum compound in a nonpolar solvent to prepare 1,4-cis polybutadiene; and a second step of polymerizing 100 parts by weight of the resultant 1,4-cis polybutadiene with 0.05 to 5 parts by weight of an aromatic organosulfur compound to prepare aromatic organosulfur functionalized 1,4-cis polybutadiene represented by Chemical Formula 1 or Chemical Formula 2.

Advantageous Effects

As described in detail above, the aromatic organosulfur functionalized 1,4-cis polybutadiene prepared in accordance with the present invention has low molecular weight distribution, no ultrahigh molecular weight region and uniform crosslinking density. Therefore, when used for rubber composition, it improves processability, elasticity and mechanical properties. Thus, it is expected to be applied usefully in natural and synthetic rubber.

DESCRIPTION OF DRAWINGS

The above and other objects, features and other advantages of the present invention will be more clearly understood from the following detailed description taken in conjunction with the accompanying drawings, in which.

BEST MODE

Hereunder is given a more detailed description of the preparation method of aromatic organosulfur functionalized 1,4-cis polybutadiene according to the present invention.

First, 1,3-butadiene or butadiene derivative is polymerized in the presence of an alkali metal catalyst or a catalyst comprising 1) 1 mol of a rare earth element compound or a transition metal compound, 2) 1 to 10 molar equivalents of a halogen containing compound, and 3) 10 to 100 molar equivalents of an organoaluminum compound in a nonpolar solvent to prepare 1,4-cis polybutadiene. The resultant 1,4-cis polybutadiene has a cis content of at least 30%, more specifically from 30 to 99%.

The catalyst used in the present invention is either an alkali metal catalyst or a catalyst comprising 1) a rare earth element compound or a transition metal compound, 2) a halogen containing compound, and 3) an organoaluminum compound. The rare earth element catalyst comprises 1) a rare earth element compound, 2) a halogen containing compound, and 3) an organoaluminum compound, and the transition metal catalyst comprises 1) a transition metal compound, 2) a halogen containing compound, and 3) an organoaluminum compound. The alkali metal catalyst comprises an alkali metal catalyst alone. Polymerization having "living property" such as one using a rare earth element catalyst or an alkali metal catalyst may be carried out using an isocyanate compound represented by the following Chemical Formula 3:

[Chemical Formula 3]

where $R_1$ is $C_4$-$C_{100}$ aryl or alkyl, and n is an integer from 2 to 10.

The isocyanate compound may be selected from $C_4$-$C_{100}$ alkyl triisocyanate, $C_4$-$C_{100}$ alkyl tetra isocyanate, aromatic triisocyanate and aromatic tetraisocyanate compounds. Specifically, hexyl diisocyanate, octyl diisocyanate, methylene diphenyl diisocyanate, hexyl triisocyanate, octyl triisocyanate, dodecyl tetraisocyanate, methylene triphenyl triisocyanate, naphthalene 1,2,5,7-tetraisocyanate, naphthalene 1,3,7-triisocyanate, tris-(p-isocyanatephenyl)-thiophosphate, carbodiimide-isocyanate cyclic derivative compound, methylene diphenyl diisocyanate, polystyryl isocyanate, and the like may be used.

The isocyanate compound is used in an amount of 0.05 to 2 parts by weight based on neodymium-polybutadiene. When the content is less than 0.05 part by weight, number of coupling may be insufficient. And, when it exceeds 2 parts by weight, Mooney viscosity may vary a lot. Hence, it is preferred that the above range be maintained.

The rare earth element compound or the transition metal compound may be a rare earth element salt or a transition metal salt of an organic acid or an inorganic acid. An organic acid salt having superior solubility in organic solvent is preferred. Particularly, a carboxylate is more preferred. The carboxylate may have $C_8$-$C_{20}$ saturated, unsaturated, cyclic or linear structure. Specifically, octoate, naphthenate, versatate, stearate, etc. may be used. Specifically, the rare earth element carboxylate may be neodymium versatate, neodymium octoate, neodymium naphthenate, and the like. Neodymium versatate in single molecular form is the most preferred in view of activity and polymer property. The transition metal carboxylate may be nickel octoate, nickel naphthenate, cobalt octoate, cobalt naphthenate, and the like.

The halogen containing compound may be a Lewis acid that contains a halogen or a halogen compound that can easily withdraw a halogen, and may be one represented by the following Chemical Formula 4:

[Chemical Formula 4]

where $R^2$ is hydrogen, $C_1$-$C_{10}$ alkyl or $C_5$-$C_{10}$ aryl, A is aluminum or boron, n is an integer from 1 to 3, m is an integer from 0 to 2, and n+m=3.

Specifically, the halogen containing compound may be diethylchloroaluminum, trifluoroboron compound, or the like.

The organoaluminum compound may be a compound represented by the following Chemical Formula 5. Specifically, it may be trimethylaluminum, triethylaluminum, tripropylaluminum, tributylaluminum, triisobutylaluminum, trihexylaluminum, diisobutylaluminum hydride, and the like.

[Chemical Formula 5]

In Chemical Formula 5, $R^3$ is hydrogen, $C_1$-$C_{10}$ alkyl or $C_5$-$C_{10}$ aryl.

The organoaluminum compound is used as a component of the rare earth element catalyst in an amount of 2 to 100 molar equivalents, preferably 10 to 100 molar equivalents, based on 1 mol of the rare earth element compound. If the content is lower than 10 molar equivalents, reactivity may decrease. And, if it exceeds 100 molar equivalents, it will result in overreactions. Hence, it is preferred that the above range be maintained. In the transition metal catalyst, it is used in an amount of 2 to 10 molar equivalents based on 1 mol of the transition metal compound. If the content is lower than 2 molar equivalents or exceeds 10 molar equivalents, reactivity may decrease. Hence, it is preferred that the above range be maintained.

The alkali metal catalyst may be a compound represented by the following Chemical Formula 6:

[Chemical Formula 6]

where M is an alkali metal selected from lithium, sodium, potassium, rhodium or cesium; and $R^4$ is hydrogen $C_1$-$C_{10}$ alkyl or $C_5$-$C_{10}$ aryl.

The solvent used for the preparation of the catalyst may be one commonly used in the art and is not particularly limited. A nonpolar solvent without reactivity with the catalyst, such as aliphatic hydrocarbon, cycloaliphatic butane, benzene, ethylbenzene or xylene may be used. Specifically, one selected from pentane, hexane, isopentane, heptane, octane, isooctane, cyclopentane, methylcyclopentane, cyclohexane, methylcyclohexane, ethylcyclohexane, benzene, toluene, ethyl benzene and xylene may be used. Preferably, the preparation solvent is used after removing oxygen and water.

The nonpolar solvent is used in an amount of 3 to 10 parts by weight based on 1 part by weight of 1,3-butadiene or butadiene derivative. When the content is below 3 parts by weight, transfer of polymerization solution may be difficult. And, when it exceeds 10 parts by weight, reactivity may decrease. Hence, it is preferred that the above range be maintained.

The reactant butadiene or butadiene derivative may be added during aging of the catalyst. This not only maintains activity of the catalyst but also prevents precipitation and affects physical properties of rubber. At that time, it is used in an amount of 1 to 10 parts by weight based on the rare earth element or transition metal compound.

Catalyst aging may be carried out as follows. A rare earth element or transition metal compound catalyst solution including butadiene or butadiene derivative is added in a catalyst reactor under nitrogen atmosphere. Then, the halogen containing compound and the organoaluminum compound are added. The sequence of addition may be different depending on processing conditions. Also, it is possible to directly add into the reactor without the aging process. Aging temperature and aging time also affect the properties of the product. Preferably, aging time ranges from 5 minutes to 2 hours, and aging temperature ranges from $-30$ to $60°$ C. The alkali metal catalyst does not require such an aging process.

The catalyst is used in an amount of $1 \times 10^{-3}$ to $1 \times 10^{-5}$ molar equivalent based on 100 g of 1,3-butadiene or butadiene derivative. When the content is below $1 \times 10^{-5}$ molar equivalent, reaction occurs slowly. And, when it exceeds $1 \times 10^{-3}$ molar equivalent, control of temperature or physical properties may be difficult due to excessive reaction. Hence, it is preferred that the above range be maintained.

The reactant 1,3-butadiene or butadiene derivative may be specifically 1,3-butadiene, isoprene, 1,3-pentadiene, 2,3-dimethyl-1,3-butadiene, myrcene, or the like.

Polymerization is initiated under highly pure nitrogen atmosphere. Preferably, polymerization temperature is from $-20$ to $100°$ C. and polymerization time is from 30 minutes to 3 hours. A yield of 70% or better can be attained.

As a result of the polymerization, 1,4-cis polybutadiene having a cis content of at least 30% and a molecular weight ranging from 50,000 to 2,000,000 is prepared.

Next, thus prepared 1,4-cis polybutadiene is reacted with 0.05 to 5 parts by weight of an aromatic organosulfur compound based on 100 parts by weight of the polybutadiene to prepare aromatic organosulfur functionalized 1,4-cis polybutadiene represented by Chemical Formula 1.

When the aromatic organosulfur compound is used in an amount less than 0.05 part by weight, peptizer effect is insufficient. And, when it is used in excess of 5 parts by weight, blending viscosity may change greatly during processing. Hence, it is preferred that the above range be maintained.

The aromatic organosulfur compound may be selected from fluorothiophenol, chlorothiophenol, bromothiophenol, iodothiophenol, difluorothiophenol, dichlorothiophenol, dibromothiophenol, diiodothiophenol, trifluorothiophenol, trichlorothiophenol, tribromothiophenol, triiodothiophenol, tetrafluorothiophenol, tetrachlorothiophenol, tetrabromothiophenol, tetraiodothiophenol, pentafluorothiophenol, pentachlorothiophenol, pentabromothiophenol, pentaiodothiophenol, fluorothiopyridine, chlorothiopyridine, bromothiopyridine, iodothiopyridine, difluorothiopyridine, dichlorothiopyridine, dibromothiopyridine, diiodothiopyridine, trifluorothiopyridine, trichlorothiopyridine, tribromothiopyridine, triiodothiopyridine, tetrafluorothiopyridine, tetrachlorothiopyridine, tetrabromothiopyridine, tetraiodothiopyridine, xylylmercaptan, tetrachlorobenzenedithiol, mercaptobenzothiazole, glycidyl pentachlorothiophenyl ether, glycidyl pentafluorothiophenyl ether, dibenzamidodiphenyl disulfide and zinc pentachlorothiophenol.

In case of transition metal-polybutadiene, the aromatic organosulfur compound is used alone, without an isocyanate compound. A radical initiator may be further added to facilitate reaction.

The radical initiator may be selected from dicumyl peroxide, dibenzoyl peroxide, t-butyl peroxybenzoate, 1,1-di(t-butylperoxy)-3,3,5-trimethylcyclohexane, and the like.

Then, after adding 2,6-di-t-butyl-p-cresol as antioxidant, methyl alcohol or ethyl alcohol is added to terminate reaction.

As a result, aromatic organosulfur functionalized 1,4-cis polybutadiene, in which the aromatic organosulfur compound is covalently bonded at the end of 1,4-cis polybutadiene, is prepared. This can be confirmed through gel permeation chromatography.

Further, heating, light radiation or radical initiator addition may be carried out in order to facilitate bonding of the aromatic organic compound with polybutadiene. The thiol group of aromatic organosulfur compound reacts readily with the vinyl group and double bond of polybutadiene. The reaction can be identified from the disappearance of the thiol peak around 2600 to 2550 cm$^{-1}$, and the degree of reaction can be confirmed through gel permeation chromatography using a UV detector.

MODE FOR INVENTION

Hereinafter, the present invention is described in more detail referring to the following examples, but the examples are not intended to limit the scope of the present invention.

Example 1

Ziegler-Natta catalyst used in the polymerization was composed of neodymium versatate (1.0 weight % cyclohexane solution), diethylaluminum chloride (1.0 M cyclohexane solution), diisobutylaluminum hydride (15 weight % cyclohexane solution) and triisobutylaluminum (1.0 M cyclohexane solution). Molar ratio of the catalysts was 1:3:4:20, and $1.0 \times 10^{-4}$ mol of neodymium catalyst was used per 100 g of monomer. 1.5 kg of cyclohexane polymerization solvent and a predetermined quantity of the aforesaid catalysts were added to a 5-L polymerization reactor. After adding 300 g of butadiene monomer, reaction was carried out at 70° C. for 2 hours. Part of the polymer solution (30 g) was taken and mass analysis was carried out through gel permeation chromatography (Mw: 394000, MWD: 3.77). Then, after adding pentachlorothiophenol (0.6 g) dissolved in tetrahydrofuran (10 mL), stirring was carried out at 100° C. for 1 hour. After adding 2,6-di-t-butyl-p-cresol (3.0 g) as antioxidant, reaction was terminated by adding polyoxyethylene phosphate (1.2 g) and ethanol (10 mL) as reaction terminator. Then, molecular analysis was carried out through gel permeation chromatography. The result is given in Table 1, FIG. 1 and FIG. 2. IR spectrum observed in CS$_2$ solution is shown in FIG. 5.

Figure 1:
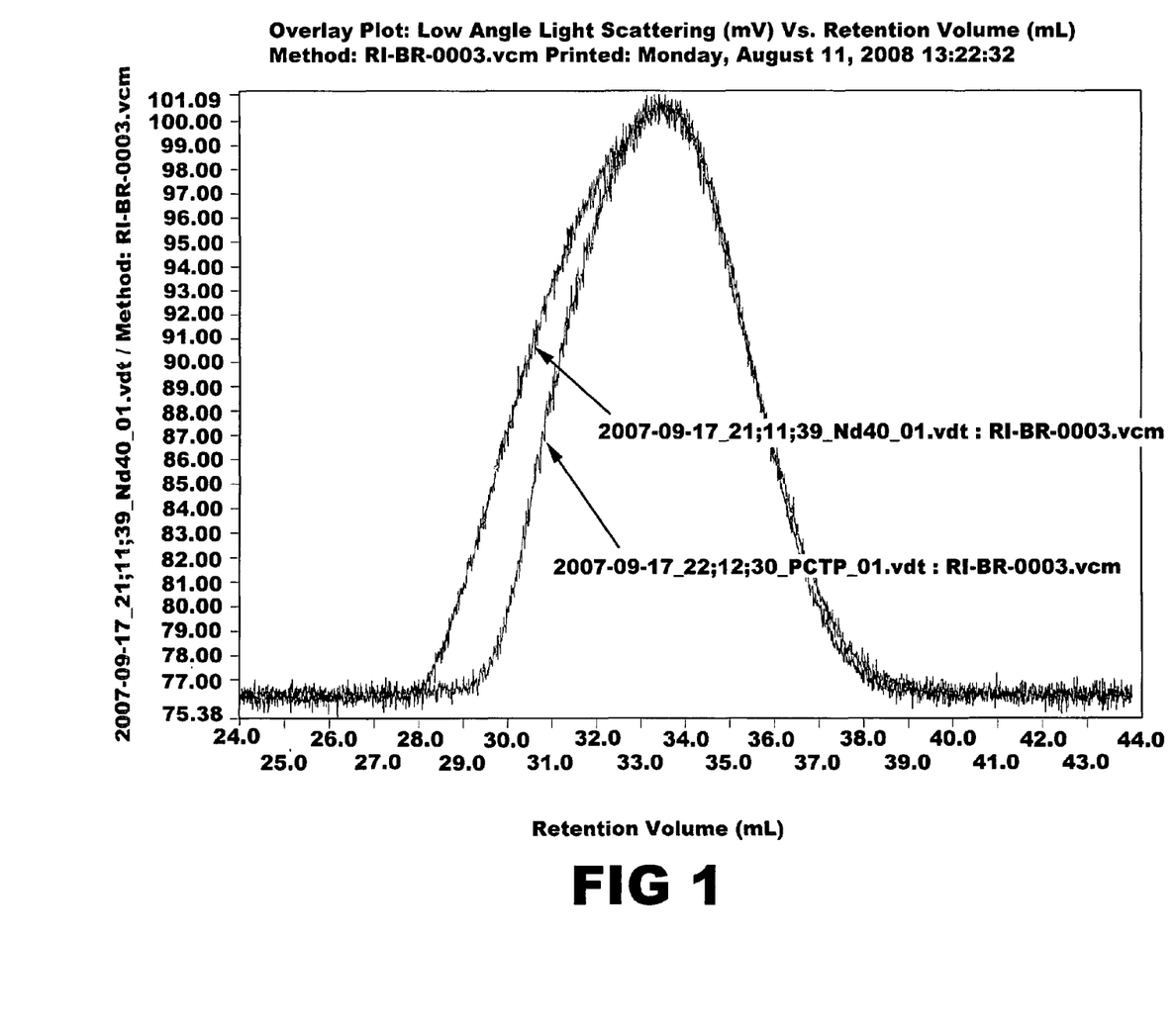
FIG. 1 shows gel permeation chromatograms of the aromatic organosulfur functionalized 1,4-cis polybutadiene of the present invention prepared in Example 1 obtained using a laser scattering detector. Blue curve is for NdBR, and red curve is for PCTP-NdBR.
Figure 2:
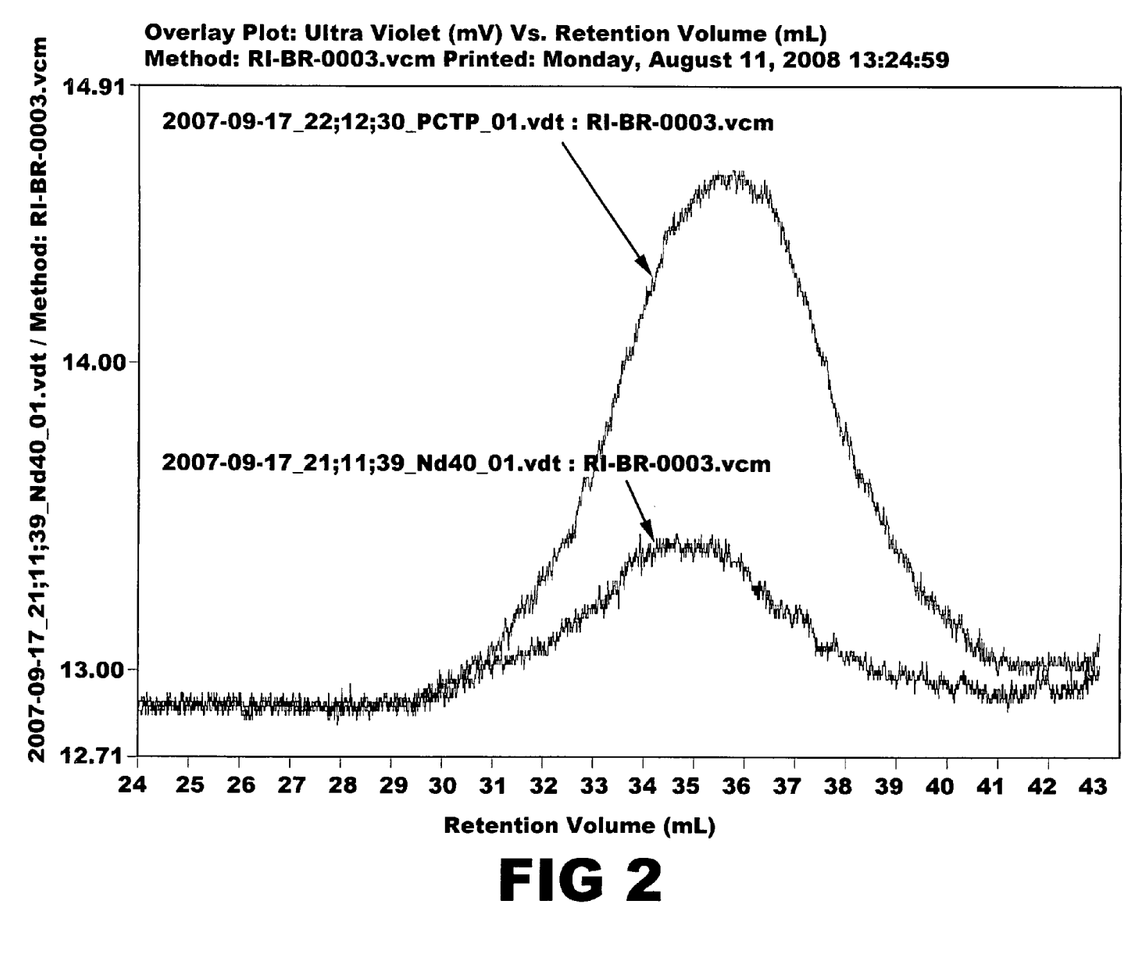
FIG. 2 shows gel permeation chromatograms of the aromatic organosulfur functionalized 1,4-cis polybutadiene of the present invention prepared in Example 1 obtained using a UV detector. Blue curve is for NdBR, and red curve is for PCTP-NdBR.

FIG. 1 shows gel permeation chromatograms observed using a laser scattering detector. Good sensitivity was attained because difference in molecular weight resulted in distinct scattering patterns. Blue curve is for neodymium-polybutadiene (NdBR, Mw: 394000, molecular weight distribution: 3.77) obtained from polymerization of butadiene in the first step, and red curve is for aromatic compound substituted polybutadiene (PCTP-NdBR, Mw: 302000 molecular weight distribution: 3.03) obtained in the second step. It was confirmed that the ultrahigh molecular weight region decreased and, as a result, molecular weight distribution decreased greatly. FIG. 2 shows gel chromatograms obtained from UV absorbance measured using a UV detector. Polybutadiene shows smaller UV absorption peak, whereas aromatic organosulfur functionalized polybutadiene shows larger peak. Blue curve is for NdBR, and red curve is for PCTP-NdBR. It was confirmed that the aromatic organosulfur was bound from high molecular weight range to low molecular weight range.

Figure 5:
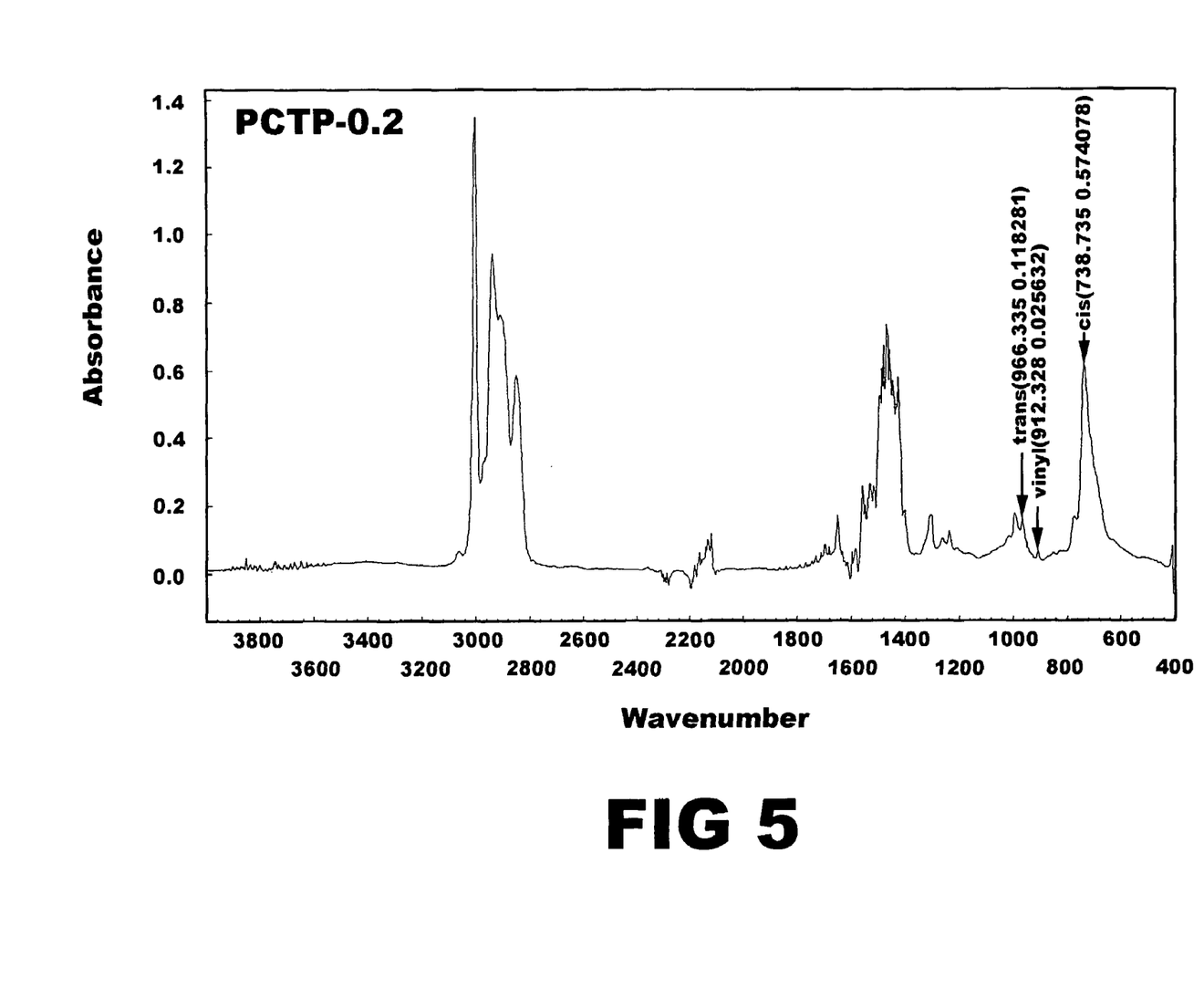
FIG. 5 shows IR spectrum of the aromatic organosulfur functionalized 1,4-cis polybutadiene (PCTP-NdBR) of the present invention prepared in Example 1 obtained in $CS_2$ solution.

FIG. 5 shows IR spectrum of PCTP-NdBR prepared above obtained in $CS_2$ solution. The disappearance of the thiol peak (2600 to 2550 $cm^{-1}$) was confirmed.

Example 2

Aromatic organosulfur functionalized 1,4-cis polybutadiene was prepared in the same manner as in Example 1, except for adding polymethylene isocyanate (1.5 g) dissolved in tetrahydrofuran (10 mL) and pentachlorothiophenol (1.5 g) dissolved in tetrahydrofuran (10 mL) instead of pentachlorothiophenol (0.6 g) dissolved in tetrahydrofuran (10 mL). Analysis result is given in Table 1.

Example 3

Aromatic organosulfur functionalized 1,4-cis polybutadiene was prepared in the same manner as in Example 1, except for adding pentafluorothiophenol (1.5 g) dissolved in tetrahydrofuran (10 mL) instead of pentachlorothiophenol (0.6 g) dissolved in tetrahydrofuran (10 mL). Analysis result is given in Table 1.

Example 4

Aromatic organosulfur functionalized 1,4-cis polybutadiene was prepared in the same manner as in Example 1, except for adding glycidyl pentachlorothiophenyl ether (1.5 g) dissolved in tetrahydrofuran (20 mL) instead of pentachlorothiophenol (0.6 g) dissolved in tetrahydrofuran (10 mL). Analysis result is given in Table 1.

Example 5

Aromatic organosulfur functionalized 1,4-cis polybutadiene was prepared in the same manner as in Example 1, except for adding dibenzamidodiphenyl disulfide (1.5 g) dissolved in tetrahydrofuran (20 mL) instead of pentachlorothiophenol (0.6 g) dissolved in tetrahydrofuran (10 mL) and adding dicumyl peroxide (0.15 g) as radical initiator. Analysis result is given in Table 1.

Example 6

Aromatic organosulfur functionalized 1,4-cis polybutadiene was prepared in the same manner as in Example 1, except for adding glycidyl pentafluorothiophenyl ether (1.5 g) dissolved in tetrahydrofuran (20 mL) instead of pentachlorothiophenol (0.6 g) dissolved in tetrahydrofuran (10 mL). Analysis result is given in Table 1.

Example 7

Aromatic organosulfur functionalized 1,4-cis polybutadiene was prepared in the same manner as in Example 1, except for adding tetrachlorothipyridine (1.5 g) dissolved in tetrahydrofuran (20 mL) instead of pentachlorothiophenol (0.6 g) dissolved in tetrahydrofuran (10 mL). Analysis result is given in Table 1, FIG. 3 and FIG. 4. IR spectrum observed in $CS_2$ solution is shown in FIG. 6.

Figure 3:
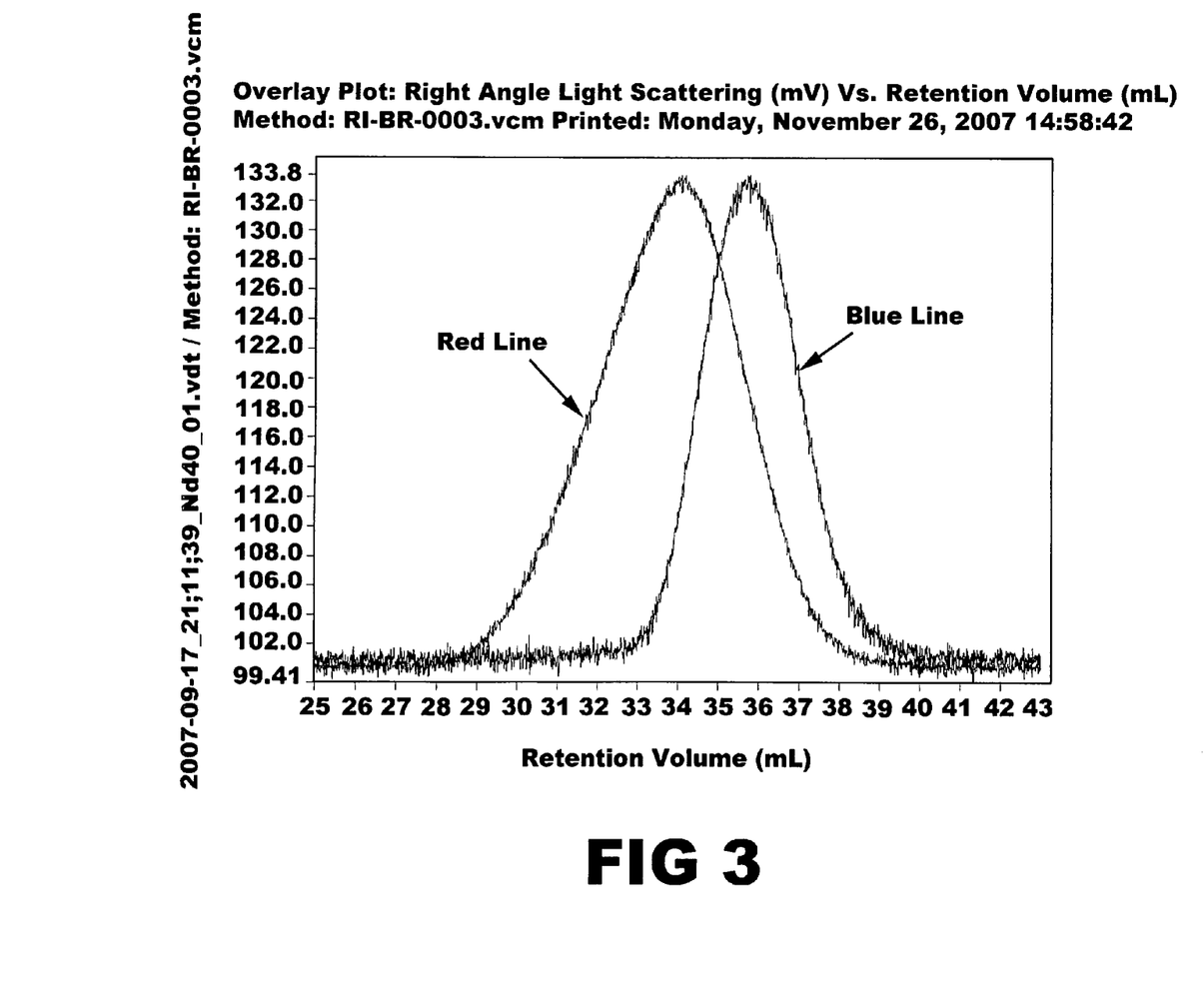
FIG. 3 shows gel permeation chromatograms of the aromatic organosulfur functionalized 1,4-cis polybutadiene of the present invention prepared in Example 7 obtained using a laser scattering detector. Red curve is for NdBR, and blue curve is for TCTP-NdBR.
Figure 4:
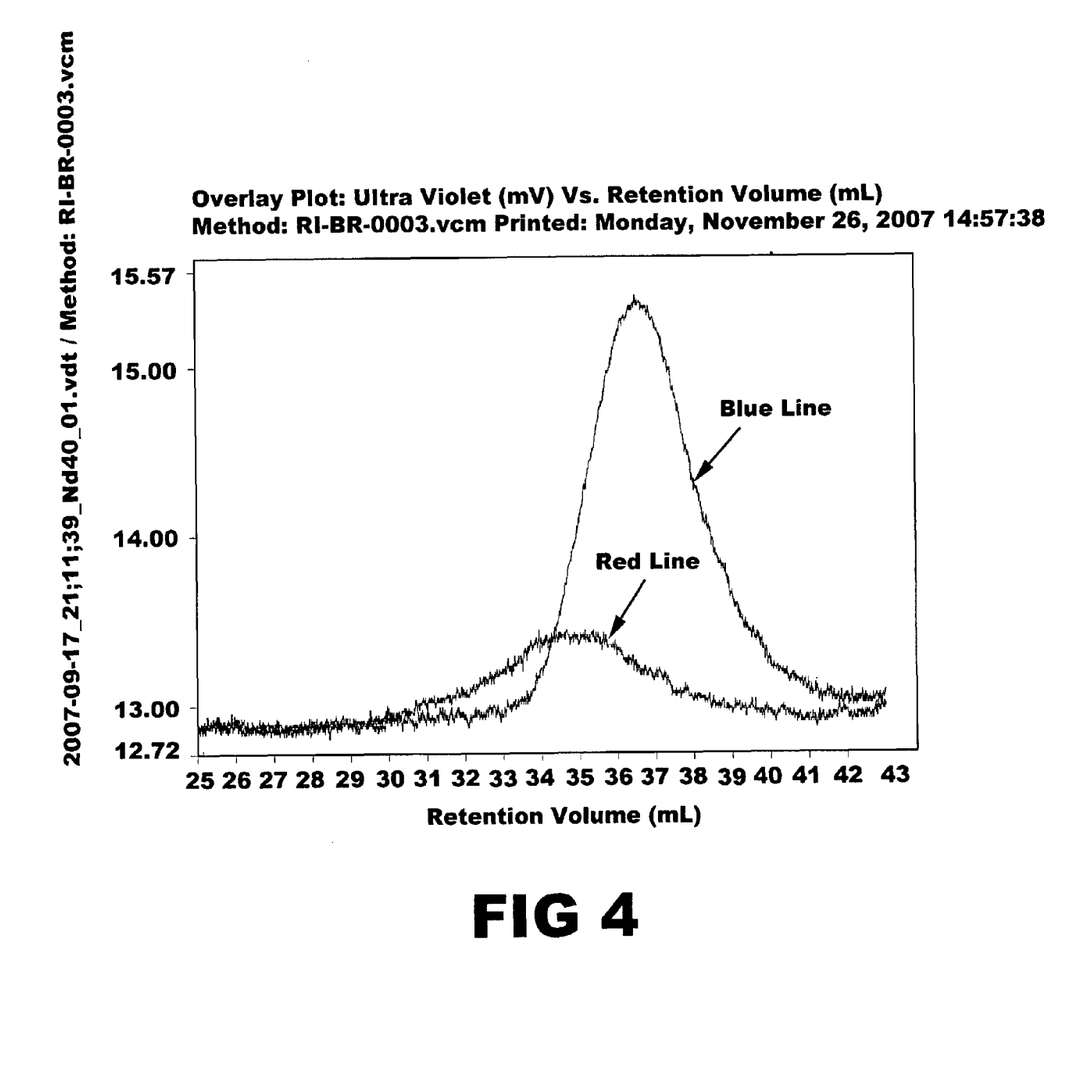
FIG. 4 shows gel permeation chromatograms of the aromatic organosulfur functionalized 1,4-cis polybutadiene of the present invention prepared in Example 7 obtained using a UV detector. Red curve is for NdBR, and blue curve is for TCTP-NdBR.

FIG. 3 shows gel chromatograms observed using a laser scattering detector. Good sensitivity was attained because difference in molecular weight resulted in distinct scattering patterns. Red curve is for neodymium-polybutadiene (NdBR, Mw: 351000, molecular weight distribution: 2.07) obtained from polymerization of butadiene in the first step, and blue curve is for aromatic compound substituted polybutadiene (TCTP-NdBR, Mw: 302000 molecular weight distribution: 3.03) obtained in the second step. It was confirmed that the ultrahigh molecular weight region decreased and, as a result, molecular weight distribution decreased greatly. FIG. 4 shows gel chromatograms obtained from UV absorbance measured using a UV detector. Polybutadiene shows smaller UV absorption peak, whereas aromatic organosulfur functionalized polybutadiene shows larger peak. Red curve is for NdBR, and blue curve is for TCTP-NdBR. It was confirmed that the aromatic organosulfur was bound from high molecular weight range to low molecular weight range.

Figure 6:
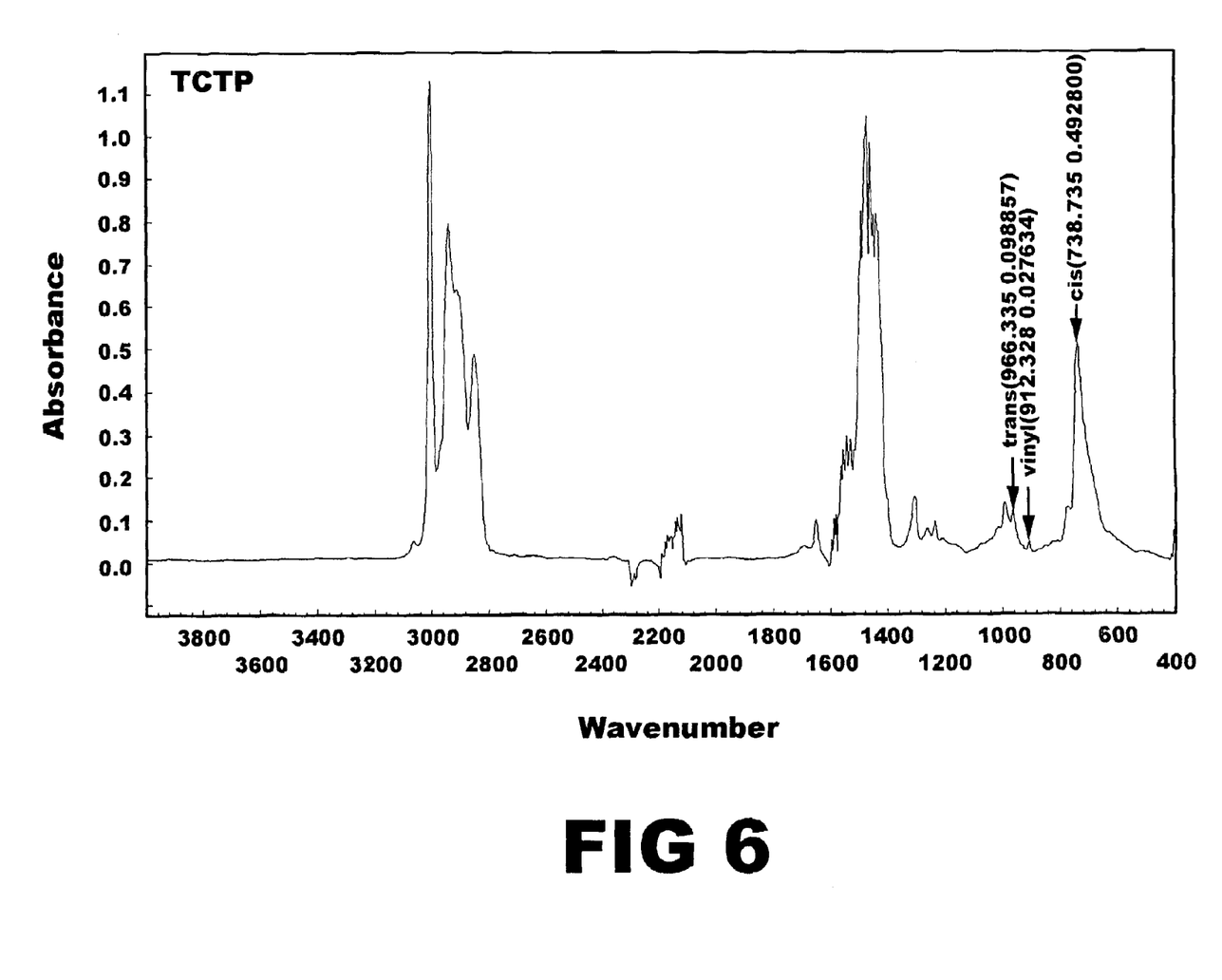
FIG. 6 shows IR spectrum of the aromatic organosulfur functionalized 1,4-cis polybutadiene (TCTP-NdBR) of the present invention prepared in Example 7 obtained in $CS_2$ solution.

FIG. 6 shows IR spectrum of TCTP-NdBR prepared above obtained in $CS_2$ solution. The disappearance of the thiol peak (2600 to 2550 $cm^{-1}$) was confirmed.

Example 8

Ziegler-Natta catalyst used in the polymerization was composed of nickel octoate (0.05 weight % toluene solution), trifluoroboron ethyl ether (1.5 weight % toluene solution) and triethylaluminum (0.8 weight % toluene solution), and 7.0× $10^{-5}$ mol of nickel catalyst was used per 100 g of monomer.

The reaction catalysts were aged by sufficiently blowing in nitrogen, sequentially adding nickel octoate, trifluoroboron ethyl ether and triethylaluminum with a molar ratio of 1:10:6 in a 100 mL round flask sealed with a rubber stopper, and carrying out aging at 20° C. for 1 hour. Polymerization was carried out by sufficiently blowing in nitrogen in a 5 L pressure reactor, adding heptane, the Ziegler-Natta catalyst aged above and 300 g of butadiene monomer, and carrying out reaction at 60° C. for 2 hours. Part of the polymer solution (30 g) was taken and mass analysis was carried out through gel permeation chromatography (Mw: 358000, MWD: 4.57). Then, after adding pentachlorothiophenol (0.6 g) dissolved in tetrahydrofuran (10 mL), stirring was carried out at 100° C. for 1 hour. After adding 2,6-di-t-butyl-p-cresol (3.0 g) as antioxidant, reaction was terminated by adding polyoxyethylene phosphate (1.2 g) and ethanol (10 mL) as reaction terminator. Then, molecular analysis was carried out through gel permeation chromatography. The result is given in Table 2.

Example 9

Aromatic organosulfur functionalized 1,4-cis polybutadiene was prepared in the same manner as in Example 8, except for adding tetrachlorothiopyridine (1.5 g) dissolved in tetrahydrofuran (20 mL) instead of pentachlorothiophenol (0.6 g) dissolved in tetrahydrofuran (10 mL). Analysis result is given in Table 2.

Example 10

Ziegler-Natta catalyst used in the polymerization was composed of cobalt octorate (0.15 mmol) and $(C_2H_5)_3Al_2Cl_3$ (1.5 mmol), and 1.5 kg of toluene and 300 g of butadiene were used. Polymerization was carried out by sufficiently blowing in nitrogen in a 5-L pressure reactor, adding toluene, the aforesaid cobalt and aluminum catalysts and 300 g of butadiene monomer, and carrying out reaction at 60° C. for 2 hours. Part of the polymer solution (30 g) was taken and mass analysis was carried out through gel permeation chromatography (Mw: 371000, MWD: 3.82). Then, after adding pentachlorothiophenol (0.6 g) dissolved in tetrahydrofuran (10 mL), stirring was carried out at 100° C. for 1 hour. After adding 2,6-di-t-butyl-p-cresol (3.0 g) as antioxidant, reaction was terminated by adding polyoxyethylene phosphate (1.2 g) and ethanol (10 mL) as reaction terminator. Then, molecular analysis was carried out through gel permeation chromatography. The result is given in Table 2.

Example 11

Aromatic organosulfur functionalized 1,4-cis polybutadiene was prepared in the same manner as in Example 8, except for adding tetrachlorothiopyridine (1.5 g) dissolved in tetrahydrofuran (20 mL) instead of pentachlorothiophenol (0.6 g) dissolved in tetrahydrofuran (10 mL). Analysis result is given in Table 2.

Example 12

Inside of a 5 L reactor was sufficiently substituted with argon gas. After adding 1500 g of purified cyclohexane and 300 g of butadiene, temperature was maintained at 60° C. Then, after adding 1.5 mL of n-butyllithium (BuLi, 2.0 M cyclohexane solution) as initiator, polymerization was carried out for 2 hours. Part of the polymer solution (30 g) was taken and mass analysis was carried out through gel permeation chromatography (Mw: 297000, MWD: 1.26). Then, after adding pentachlorothiophenol (0.6 g) dissolved in tetrahydrofuran (10 mL), stirring was carried out at 100° C. for 1 hour. Polymerization was terminated by adding a small amount of methanol to the polymerization solution in order to completely remove activity of the living polymer, and then adding 1 g of Irganox 1076 (Aldrich) and 1.5 g of tris(nonylphenol) as antioxidant.

Example 13

Aromatic organosulfur functionalized 1,4-cis polybutadiene was prepared in the same manner as in Example 12, except for adding tetrachlorothiopyridine (1.5 g) dissolved in tetrahydrofuran (20 mL) instead of pentachlorothiophenol (0.6 g) dissolved in tetrahydrofuran (10 mL). Analysis result is given in Table 2.

Physical properties of aromatic organosulfur functionalized 1,4-cis polybutadiene prepared in Examples 1 to 13 are summarized in the following Tables 1 to 3.

Physical Property Measurement

1) Mooney Viscosity

Solid rubber (30 g) was taken from each polymer, and prepared into two samples (thickness: 0.8 cm, area: 5 cm×5 cm) using a roller. The samples were attached at the front and back of a rotor. After mounting the rotor in a rotary viscometer (Alpha Technologies, Mooney MV2000) and pre-heating at 100° C. for 1 minute, change of viscosity of the solid rubber after operation of the rotor was observed for 4 minutes. Mooney viscosity was obtained as $ML_{1+4}$ (100° C.) value.

2) Cis Content

Cis content was measured by the Morero method. Test sample was prepared by completely melting 40 mg of solid rubber in 5 mL of $CS_2$. The rubber solution was put in KBr cells spaced by 1 mm, and absorbance was measured using an IR spectrometer (FTS-60A, Bio-Rad).

IR peaks to be monitored were cis absorption (AC) at 739 $cm^{-1}$, vinyl absorption (AV) at 912 $cm^{-1}$, and trans absorption (AT) at 966 $cm^{-1}$. From the absorbance measurement, cis content can be calculated by the following equations.

$$C=(1.7455AC-0.0151AV) \quad (1)$$

$$V=(0.3746AV-0.0070AC) \quad (2)$$

$$T=(0.4292AT-0.0129AV-0.0454AC) \quad (3)$$

$$Cis(\%)=C/(C+V+T)\times 100 \quad (4)$$

$$Trans(\%)=T/(C+V+T)\times 100 \quad (5)$$

$$Vinyl(\%)=V/(C+V+T)\times 100 \quad (6)$$

TABLE 1

| | Aromatic organosulfur | Aromatic organosulfur content (phr)[1] | Mooney viscosity | Mw[2] | MWD[3] | Cis (%) | Trans (%) | Vinyl (%) |
|---|---|---|---|---|---|---|---|---|
| Ex. 1 | PCTP | 0.2 | 40.5 | 302000 | 3.03 | 97.5 | 1.6 | 0.9 |
| Ex. 2 | PCTP | 0.5 | 35.5 | 272000 | 2.75 | 97.6 | 2.0 | 0.4 |
| Ex. 3 | PFTP | 0.5 | 38.5 | 297000 | 2.98 | 97.5 | 2.0 | 0.5 |
| Ex. 4 | GPCTP | 0.2 | 40.5 | 323000 | 3.20 | 97.3 | 1.5 | 1.2 |
| Ex. 5 | DBD | 0.2 | 42.0 | 339000 | 3.09 | 97.2 | 1.4 | 1.4 |
| Ex. 6 | GPFTP | 0.5 | 39.5 | 323000 | 2.85 | 97.3 | 2.4 | 0.3 |
| Ex. 7 | TCTP | 0.5 | 25.0 | 113000 | 2.07 | 97.4 | 2.2 | 0.4 |

PCTP: pentachlorothiophenol
GPCTP: glycidyl pentachlorothiophenyl ether
GPFTP: glycidyl pentafluorothiophenyl ether
DBD: dibenzamidodiphenyl sulfide
ZnPCP: zinc tetrachlorothiophenol
TCTP: tetrachlorothiophenol
[1] Parts by weight based on polybutadiene
[2] Mw: weight average molecular weight
[3] MWD: molecular weight distribution
Polymerization catalysts in Ex. 1-7: rare earth metal (neodymium)

TABLE 2

| | Catalyst | Aromatic organosulfur | Aromatic organosulfur content | Mooney viscosity ($ML_{1+4}$, 100° C.) | Mw | MWD | Cis (%) | Trans (%) | Vinyl (%) |
|---|---|---|---|---|---|---|---|---|---|
| Ex. 8 | Ni | PCTP | 0.2 | 40.5 | 281000 | 3.50 | 95.3 | 2.5 | 2.2 |
| Ex. 9 | Ni | TCTP | 0.5 | 37.0 | 275000 | 3.52 | 95.7 | 2.4 | 1.9 |
| Ex. 10 | Co | PCTP | 0.2 | 39.5 | 319000 | 3.15 | 95.5 | 2.4 | 2.1 |
| Ex. 11 | Co | TCTP | 0.5 | 38.0 | 275000 | 3.09 | 95.6 | 2.7 | 1.7 |

TABLE 3

| | Catalyst | Aromatic organosulfur | Aromatic organosulfur content | Mooney viscosity ($ML_{1+4}$, 100° C.) | Mw | MWD | Cis (%) | Trans (%) | Vinyl (%) |
|---|---|---|---|---|---|---|---|---|---|
| Ex. 12 | Li | PCTP | 0.2 | 50.5 | 251000 | 1.15 | 34.8 | 53.0 | 12.2 |
| Ex. 13 | Li | TCTP | 0.5 | 45.5 | 225000 | 1.07 | 35.0 | 53.5 | 11.5 |

Li: n-BuLi

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. Aromatic organosulfur functionalized 1,4-cis polybutadiene represented by the following Chemical Formula 2:

[Chemical Formula 2]

where l, m, n and o respectively represent the number of repeating units of polybutadiene main chain, with l ranging from 30 to 99 weight %, m ranging from 0.05 to 5 weight %, n ranging from 0 to 50 weight %, o ranging from 0 to 50 weight %, and l+m+n+o=100 weight %, SAr represents a group from an aromatic organosulfur compound, and $R_1$ represents an isocyanate compound.

2. The polybutadiene as set forth in claim 1, wherein the aromatic organosulfur compound is comprised in an amount of 0.05 to 5 parts by weight based on 100 parts by weight of the 1,4-cis polybutadiene.

3. The polybutadiene as set forth in claim 1, wherein the aromatic organosulfur compound is selected from fluorothiophenol, chlorothiophenol, bromothiophenol, iodothiophenol, difluorothiophenol, dichlorothiophenol, dibromothiophenol, diiodothiophenol, trifluorothiophenol, trichlorothiophenol, tribromothiophenol, triiodothiophenol, tetrafluorothiophenol, tetrachlorothiophenol, tetrabromothiophenol, tetraiodothiophenol, pentafluorothiophenol, pentachlorothiophenol, pentabromothiophenol, pentaiodothiophenol, fluorothiopyridine, chlorothiopyridine, bromothiopyridine, iodothiopyridine, difluorothiopyridine, dichlorothiopyridine, dibromothiopyridine, diiodothiopyridine, trifluorothiopyridine, trichlorothiopyridine, tribromothiopyridine, triiodothiopyridine, tetrafluorothiopyridine, tetrachlorothiopyridine, tetrabromothiopyridine, tetraiodothiopyridine, xylylmercaptan, tetrachlorobenzenedithiol, mercaptobenzothiazole, glycidyl pentachlorothiophenyl ether, glycidyl pentafluorothiophenyl ether, dibenzamidodiphenyl disulfide and zinc pentachlorothiophenol.

4. The polybutadiene as set forth in claim 1, which has a cis content of 30 to 99% and a molecular weight ranging from 50,000 to 2,000,000 Mw.

* * * * *